(12) United States Patent
Ghigo et al.

(10) Patent No.: US 8,166,086 B2
(45) Date of Patent: Apr. 24, 2012

(54) METHOD AND CIRCUIT FOR GENERATING RANDOM NUMBERS, AND COMPUTER PROGRAM PRODUCT THEREFOR

(75) Inventors: Giovanni Ghigo, Turin (IT); Loris Bollea, Turin (IT)

(73) Assignee: Telecom Italia S.p.A., Milan (IT)

( * ) Notice: Subject to any disclaimer, the term of this patent is extended or adjusted under 35 U.S.C. 154(b) by 963 days.

(21) Appl. No.: 10/589,552

(22) PCT Filed: Feb. 26, 2004

(86) PCT No.: PCT/EP2004/001928
§ 371 (c)(1),
(2), (4) Date: Aug. 16, 2006

(87) PCT Pub. No.: WO2005/083561
PCT Pub. Date: Sep. 9, 2005

(65) Prior Publication Data
US 2007/0140485 A1    Jun. 21, 2007

(51) Int. Cl.
*G06F 1/02* (2006.01)
*G06F 7/58* (2006.01)
(52) U.S. Cl. ........ 708/252; 708/250; 708/251; 708/253; 708/254; 708/255; 708/256; 380/46; 380/286
(58) Field of Classification Search ............ 380/46
See application file for complete search history.

(56) References Cited

U.S. PATENT DOCUMENTS

| | | | |
|---|---|---|---|
| 3,706,941 A | 12/1972 | Cohn | |
| 4,667,301 A * | 5/1987 | Chiu et al. | 708/250 |
| 5,383,143 A * | 1/1995 | Crouch et al. | 708/254 |
| 5,799,088 A | 8/1998 | Raike | |
| 6,408,317 B1 | 6/2002 | Djakovic | |
| 6,807,553 B2 | 10/2004 | Oerlemans | |
| 7,480,687 B2 * | 1/2009 | Dirscherl et al. | 708/252 |
| 2002/0156819 A1 | 10/2002 | Oerlemans | |
| 2003/0059049 A1 | 3/2003 | Mihm et al. | |
| 2004/0019619 A1 | 1/2004 | Buer et al. | |
| 2005/0055391 A1 * | 3/2005 | Carlson et al. | 708/250 |

FOREIGN PATENT DOCUMENTS

WO   WO 01/67231   9/2001

OTHER PUBLICATIONS

Davies, "Hardware Random Number Generators", 15th Australian Statistic Conference, pp. 1-14, (2000).
Schneier, "Pseudo-Random-Sequence Generators and Stream Ciphers", Applied Cryptography: Protocols, Algorithms, and Source Code in C, 2nd Edition, Chapter 16, pp. 369-395, (1996).

* cited by examiner

Primary Examiner — Nathan Flynn
Assistant Examiner — Bryan Wright
(74) Attorney, Agent, or Firm — Finnegan, Henderson, Farabow, Garrett & Dunner, L.L.P.

(57) ABSTRACT

A random number generator uses the output of a true random generator to alter the behavior of a pseudo-random number generator. The alteration is performed by a mixing logic that builds a random seed for the pseudo-random number generator and includes a generator of an alteration signal, the generation of which exploits the random instant of arrival of the bits outgoing from the true random generator. The alteration signal is obtained by processing the seed by means of the pseudo-random sequence.

18 Claims, 4 Drawing Sheets

METHOD AND CIRCUIT FOR GENERATING RANDOM NUMBERS, AND COMPUTER PROGRAM PRODUCT THEREFOR

CROSS REFERENCE TO RELATED APPLICATION

This application is a national phase application based on PCT/EP2004/001928, filed Feb. 26, 2004, the content of which is incorporated herein by reference.

FIELD OF THE INVENTION

The present invention relates to random number generators that could be implemented in digital integrated circuits like Application Specific Integrated Circuits (ASICs) and Field Programmable Gate Arrays (FPGAs), and more particularly it concerns a high speed random number generator of the kind in which a pseudo-random number generator uses as seed the random numbers generated by a true random number generator.

BACKGROUND OF THE INVENTION

A lot of applications, like simulation, gaming, statistics, cryptography and generally security applications, etc., require use of random number generators.

Generally, existing random number generators can be subdivided into two main categories: hardware-based generators and software-based generators.

Hardware-based generators, commonly referred to as True Random Number Generators (TRNG), exploit randomly occurring physical phenomena like electrical noise, oscillator jitter, flip-flop metastability and so on. When using a true random number generator, measures are to be taken to avoid that the generated sequence is affected by biasing (the tendency to preferably generate either of the two digital values), short term auto-correlation and other deviations from randomness, as disclosed for instance the paper "Hardware Random Number Generators" presented by R. Davies at the 15th Australian Statistics Conference, July 2000, and published on Oct. 14, 2000 on the Internet site http://www.robertnz.net. The main problem with such generators is that, being the physical principle on which they are based actually random, they do not guarantee a specified output bit rate and the bit rate itself is not very high. This makes TRNGs unsuitable for applications like simulations, real-time cryptography e.g. in telecommunications, etc.

Software generators, commonly referred to as Pseudo-Random Number Generators (PRNG), are deterministic generators that use an algebraic algorithm to create a periodic sequence of random numbers with a very long period that depends on the generator architecture. A number of architectures for such generators are disclosed in "Applied Cryptography: Protocols, Algorithms and Source Code in C", by B. Schneier, 2nd Edition, 1996, J. Wiley & Sons, Inc., see in particular Chapter 16. These generators can operate at a predetermined and relatively high bit rate. Yet, since the sequence is based on an algorithmic process, it is possible to guess the random number n+1 if the random number n is known. This can allow a recovery of the "seed" used for the generation. In some applications, e.g. simulation, this is not important and is not a problem for the correct work of the application. In other cases, e.g. cryptography and security applications, the possibility of recovering the seed, even with a considerable effort, is of course a weakness in the security chain.

A commonly adopted solution to overcome the above problems is to combine a true random generator and a pseudo-random generator and to use the output of the true random generator to alter the pseudo-random sequence, which forms the output sequence. For instance, the true random numbers are uses as seed for the pseudo-random generator. The use of a pseudo-random generator solves the problem of the low bit rate of the hardware generator. Continuously modifying the output of the pseudo-random generator by using the true random sequence tries to overcome the problem of the deterministic nature of the pseudo-random number generator.

Several implementations of that solution are known in the art.

The above mentioned paper of R. Davies suggests to merge the bit streams from the PRNG and the TRNG by means of a simple EX-OR operation.

Somewhat more sophisticated techniques exist in the patent literature.

U.S. Pat. No. 6,408,317 modifies a PRNG in the form of a Linear Feedback Shift Register (LFSR) by using a condenser function to calculate a bit stream to be EXORed with the output of the LFSR itself. Moreover the feedback function of the LFSR is modified continuously by the random bits coming at constant bit rate from a TRNG. Thus, the output bit stream should have the same bit rate as the TRNG. The device disclosed in that document cannot obtain high bit rates and, moreover, it exploits only one randomness factor, i.e. the random value of the TRNG sequence.

US-A 2003/0059046 includes a deterministic generator composed by three LFSRs, the interaction among which is modified through a scrambling function driven by a TRNG emitting a constant bit-rate sequence. Also in that case only one randomness factor is exploited.

US-A 2002/0156819 also modifies a LFSR acting as PRNG through an EX-OR operator at the input of the LFSR itself. In this case the modifying signal is generated by means of the interaction of three free-running oscillators having different oscillation frequencies, different also from that of the system clock driving the LFSR. Also in this case only the random value of the EX-OR output can be exploited, since the time dependence in the modifying signal is very weak, is strongly correlated and is mostly deterministic. Indeed, the modifying signal is fed to the LFSR after having been latched by using the system clock so that a modifying signal at constant bit rate is obtained.

Thus, all such prior proposals for modifying the behaviour of the pseudo-random generator are based on techniques that use a single randomness factor, so that they are rather simple and do not guarantee a good and deep interaction with the PRNG. Thus, a non-negligible possibility of attack still exists.

It is a main object of the invention to provide a random number generator and a method of random number generation, which are based on the alteration of a pseudo-random sequence by means of a true random sequence, and in which a more sophisticated technique for modifying the behaviour of the pseudo-random generator is used, by exploiting both the random value and the random arrival of the bits in the true random sequence.

SUMMARY OF THE INVENTION

According to the invention, there is provided a high speed random number generator, comprising: a true random number generator; a pseudo-random number generator, arranged to generate a pseudo-random sequence by using the true random numbers produced by said true random number generator as random seeds; and a mixing logic connected between said true random number generator and said pseudo-random number generator and arranged to alter the behaviour of said pseudo-random number generator by using the random seeds. Said generator is characterised in that said true random generator is arranged to generate a random sequence of bits having variable rate, i.e. variable inter-arrival time of the bits, whereby the seeds become available at random instants; and in that said mixing logic comprises a generator of an alteration signal intended to change the behaviour of said pseudo-random number generator at multiple random instants in the interval between two subsequent seeds, thereby obtaining in said interval multiple pseudo-random sequences of random lengths shorter than the random length determined by the arrival of two subsequent seed values, said generator of the alteration signal being connected so as to receive said seed and generate said alteration signal by processing said seed by means of the sequence generated by said pseudo-random number generator.

The invention also provides a method of high-speed generation of random numbers by altering a pseudo-random sequence by means of true random numbers forming random seeds for the generation of said pseudo-random sequence, the method comprising the steps of: obtaining the random seeds from a random sequence of bits having variable rate; processing a random seed to generate an alteration signal exploiting the random arrival time of the bits of said sequence of bits; and changing the pseudo-random sequence by said alteration signal at random instants between the arrival of two subsequent seeds, thereby obtaining in said interval multiple pseudo-random sequences of random lengths shorter than the lengths determined by the arrival of two subsequent seeds, said alteration signal being generated under the control of the pseudo-random sequence.

The invention also provides a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is obviously intended to highlight the possibility for the arrangement of the invention to be implemented in a de-centralized fashion.

Thus, the invention provides a generator and a method in which the deterministic output of the PRNG is modified by more sophisticated alteration technique exploiting a plurality of random events, so that the possibility of recovering the generation law by observing the output sequence is dramatically reduced and a far greater security is obtained with respect to the prior art systems which are based only or almost only on the random value of a TRNG.

BRIEF DESCRIPTION OF THE DRAWINGS

A preferred embodiment of the invention, given by way of non-limiting example, will now be disclosed with reference to the accompanying drawings, in which.

DETAILED DESCRIPTION OF THE PREFERRED EMBODIMENT

Figure 1:
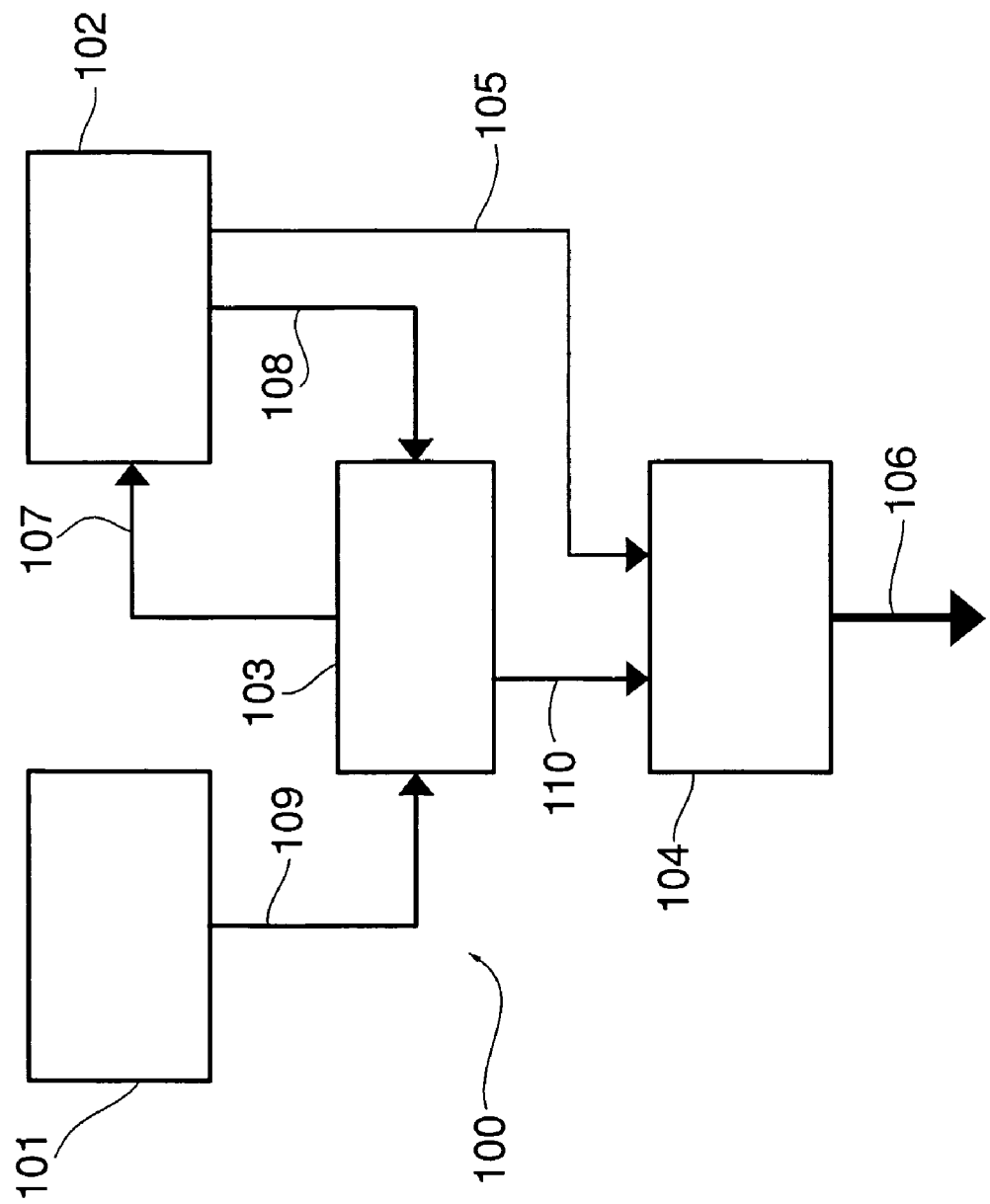
FIG. 1 is a general block diagram of the generator according to the invention.

FIG. 1 shows the main functional blocks of the high speed random number generator according to the invention, generally denoted 100. Like the prior art generators mentioned above, generator 100 is based on the use of a True Random Number Generator (TRNG) 101 and a Pseudo-Random Number Generator (PRNG) 102.

TRNG 101 is the source of a sequence of random bits with variable bit rate, i.e. variable inter-arrival time, from which a random seed for the sequence generated by PRNG 102 is built. A mixing logic 103 receives the output sequence of TRNG 101, present on line 109, and obtains therefrom the random seed to be applied to PRNG 102 to introduce random alterations in its behaviour. An output logic 104 receives the serial stream issued by PRNG 102 on line 105 and provides a parallel output on line 106 by converting the 1-bit signal into words having a desired length. Output logic 104 may be controlled by mixing logic 103, as schematised by line 110, as explained in detail hereinafter.

The core of the invention is mixing logic 103, together with its interaction with PRNG 102 through feedback and feed-forward signals (lines 107 and 108, respectively).

According to the invention, mixing logic 103 exploits multiple sources of randomness, namely:

the random values of the sequence of bits at the output of TRNG 101;

the random arrival time of the bits generated by TRNG 101. In order also this source of randomness can be exploited, such bits should have a variable bit rate, i.e. a inter-arrival time, between two or more random bits should not be constant. This condition can be met with a TRNG based on physical phenomena like metastability, thermal noise and others. Preferably, a TRNG exploiting the metastability of a flip-flop is used. An example of a TRNG of that kind, providing a bit sequence with the required variability, is disclosed in WO-A 01/67231.

Figure 2:
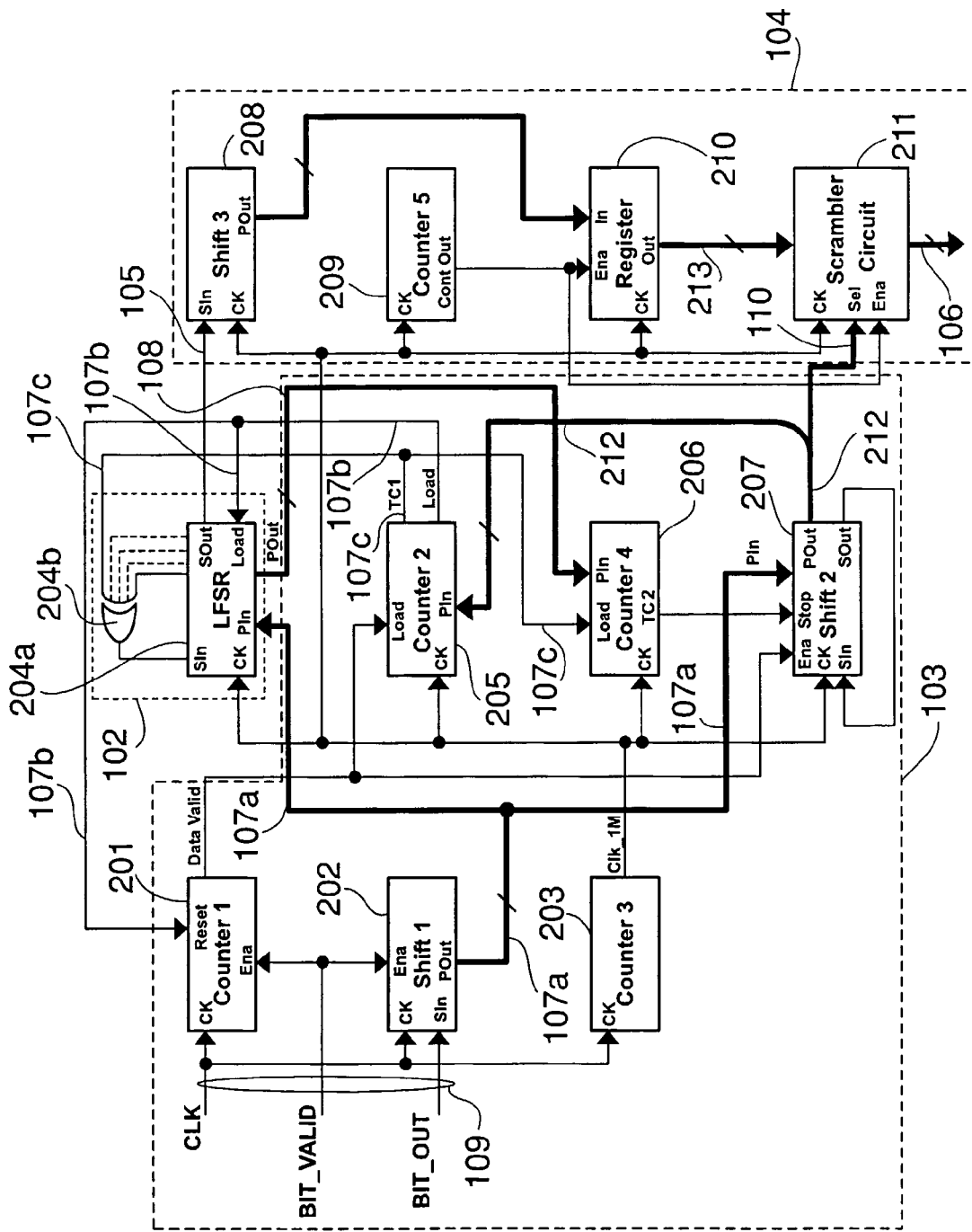
FIG. 2 is a more detailed block and circuit diagram of blocks 102-104 of FIG. 1.

FIG. 2 shows a more detailed block diagram of PRNG 102, mixing logic 103 and output logic 104.

In this embodiment, it is assumed by way of non-limiting example that PRNG 102 is based on a Linear Feedback Shift Register (LFSR). References 204a, 204b respectively denote the actual shift register and the feedback logic, usually an EX-OR gate, combining and feeding back a number of the shift register outputs to the shift register input. For sake of clarity of the description and by way of example only, it is assumed that shift register 204a is 40-bit long. Hereinafter, the terms LFSR and PRNG will be used indifferently.

The input of mixing logic 103 is signal BIT_OUT representing the serial bit stream coming from TRNG 101 through a proper wire of line 109. In association with this signal, signal BIT_VALID on another wire of line 109 indicates when a bit of the stream is to be considered random (i.e. it actually represents a metastable condition, in the exemplary embodiment of TRNG considered here). Signal BIT_VALID is the enable signal for a first shift register 202 (also referred to as input FIFO) and a first counter 201 (also referred to as FIFO Data Counter). Input FIFO 202 loads the valid bits in stream BIT_OUT and acts as serial-to-parallel converter. The parallelised signal are outputted on a bus 107a, belonging to line 107 of FIG. 1 as words of a given length FIFO_COUNT, which form a random seed for LFSR 102. In the exemplary embodiment of a 40-bit long LFSR, FIFO_COUNT is also 40 bit. FIFO data counter 201 counts the bits loaded into input FIFO 202 and, when it reaches value FIFO_COUNT, generates a "Data Valid" signal indicating that a new random seed is available on bus 107a.

Output bus 107a of FIFO 202 is connected to the parallel inputs of both LFSR 102 and a second shift register 207 (also referred to as recycle register). The random seed present on bus 107a is loaded directly into recycle register 207 whenever the "Data Valid" signal is generated by FIFO data counter 201. The loading into LFSR 102 is on the contrary an indirect one, and it is controlled by a load signal generated by a second counter 205 (also referred to as sample counter) on wire 107b of line 107, when such counter receives the Data Valid signal at its load input. The load signal on wire 107b is also used as a reset for FIFO data counter 201 and it indicates the beginning of a new accumulation phase of the random bits into input FIFO 202.

This kind of handshake control generated by sample counter 205 is necessary because it is the link between two clock domains: the first clock (clock CLK of sequence BIT_OUT at the input of mixing logic 103) is a high speed clock and the second (denoted Clk_1M) is a clock at a lower speed used by LFSR 102, the downstream blocks of mixing logic 103 and output logic 104. The slower clock is chosen so as to give a good trade-off between output bit rate and security (the higher the clock, the longer the sub-sequences resulting from the alterations of the behaviour of LFSR 102 between two subsequent seeds, as it will be explained below). Suitable values for the slower clock Clk_1M and the faster clock CLK might be 1 MHz and 25 MHz, respectively. The lower speed clock is directly derived from the higher speed clock by a third counter 203: so the circuit is synchronous and provides a constant output bit rate independent and even multiple of the variable bit rate of the random data.

It is to be appreciated that clock Clk_1M generally corresponds to a much higher bit rate than that of the valid bits in BIT_OUT, so that the present invention can introduce a bit rate multiplication.

In the absence of other alteration signals than the random seed, LFSR 102 would generate pseudo-random bits from a sequence started with a present seed and would continue according to that sequence until a new seed is loaded. When a new seed arrives, LFSR 102 jumps to a new point in the sequence, specified by the new seed, and continues generating bits from that point. Since the arrival time of a new seed is random, this does not guarantee a minimum refresh frequency for the seed of LFSR 102. Consequently, the possibility exists of having long pseudo-random sequences that could reduce the cryptographic security of the generator.

To avoid this possibility, mixing logic 103 has a special circuit exploiting the variable arrival time of new seeds to add further randomness to LFSR 102. That circuit consists of sample counter 205, a fourth counter 206 (also referred to as recycle counter) and recycle register 207.

More particularly, when a seed arrives (Data Valid signal from counter 201), sample counter 205 is loaded with some bits of the seed, provided by recycle register 207 through a bus 212. The number of bits to be loaded into counter 205 is indicated by a parameter SAMPLE_MAX_COUNT. With the exemplary length of 40 bits for the seed, a suitable value of SAMPLE_MAX_COUNT could be 10.

Sample counter 205 is a down counter that counts down from the value indicated by the bits on bus 212 to zero. At the end of its count, counter 205 generates a terminal count signal TC1 that goes to feedback EX-OR 204b of LFSR 102 through wire 107c and modifies, for one clock cycle, the polynomial of shift register 204a. This causes a change in the sequence of the LFSR, resulting in a shorter pseudo-random sequence than if a new seed was waited for. Sample counter 205 is moreover so constructed that, after generation of TC1, it is loaded again with a new value. Thus, the alteration of the behaviour of LFSR 102 occurs at multiple random instants during the interval between two subsequent Data Valid signals. Of course, whenever a new Data Valid signal arrives at sample counter 205, a new set of bits is loaded, even if counter 205 has not yet reached its terminal count, so that the alteration exploits also the random arrival times of the seeds.

Signal TC1 is sent also to recycle counter 206 as load signal, for the purposes that will be explained below.

As said, the SAMPLE_MAX_COUNT bits to be loaded into sample counter 205 are taken from recycle register 207 that, at the beginning, contains a copy of the seed.

Recycle register 207 is a recirculating shift register that, during the count down of sample counter 205, rotates the seed by an amount specified by recycle counter 206. Recycle counter 206 also is a down counter that is loaded with some bits taken from LFSR 102, and counts down from the value specified by said bits to 0. The terminal count signal TC2 of counter 206 is fed to recycle register 207 to stop the rotation.

The number of bits to be loaded into recycle counter 206 is specified by a parameter RECYCLE_COUNT. A suitable value for such parameter, with the value assumed for SAMPLE_MAX_COUNT, could be 5. Those bits are supplied to recycle counter 206 through line 108 and are loaded into said counter when sample counter 205 generates its terminal count signal TC1. Thus, the starting count value of recycle counter 206 is a random value and causes the seed to be rotated by a random amount during each cycle. So, each time sample counter 205 is re-loaded, it is loaded with a different and randomly variable number SAMPLE_MAX_COUNT of bits, which in turn are taken from a random sequence.

The manner in which the SAMPLE_MAX_COUNT and the RECYCLE_COUNT bits to be fed to sample counter 205 and recycle counter 206 are chosen has no relevance. The simplest solution is of course to use contiguous bits, but bits taken from any position in shift registers 204a and 207 can be used as well.

As a conclusion, the behaviour of the LFSR is randomly altered by sample counter 205 and, in turn, the randomly altered sequence from the LFSR is used to randomly alter the value counted by sample counter 205. This kind of feedforward and feedback interaction between mixing logic 103 and pseudo-random generator 102 assists in avoiding cycles and loops.

Thanks to the co-operation of counters 205, 206 and register 207, LFSR 102 generates, instead of a rather long unique pseudo-random sequence of bits defined by the arrival of two subsequent seeds, a random number of shorter sequences of random lengths. This makes extremely hard to attempt recovering the generation law of the output sequence even by a long-term observation thereof.

The pseudo-random sequences of bits serially outgoing from LFSR 102 on line 105 are fed to a third shift register 208 (Output Shift Register), belonging to output logic 104 and acting as serial-to-parallel converter. Shift register 208 generates parallel words having length MAX_COUNT, for instance 32 bits. Such words are fed to an output register 210 that is enabled to load a new word when a fifth counter 209 (output data counter) recognises that MAX_COUNT bits have been loaded into shift register 208. The word stored in output register 210 will then be emitted on output 213.

Output 213 could already be the generator output. However, with the circuit described above, the bit sequence generated by PRNG 102 is still not completely a random sequence between two subsequent perturbations of the behaviour of PRNG 102. In fact, between two perturbations, the output of PRNG is still deterministic and so, by observing the present output and knowing the architecture of the PRNG, it would be theoretically still possible to predict the future bit sequence. This issue has been solved by using a scrambler circuit 211 that scrambles in a random way the MAX_COUNT bits of each word on output 213 of register 210.

Figure 3:
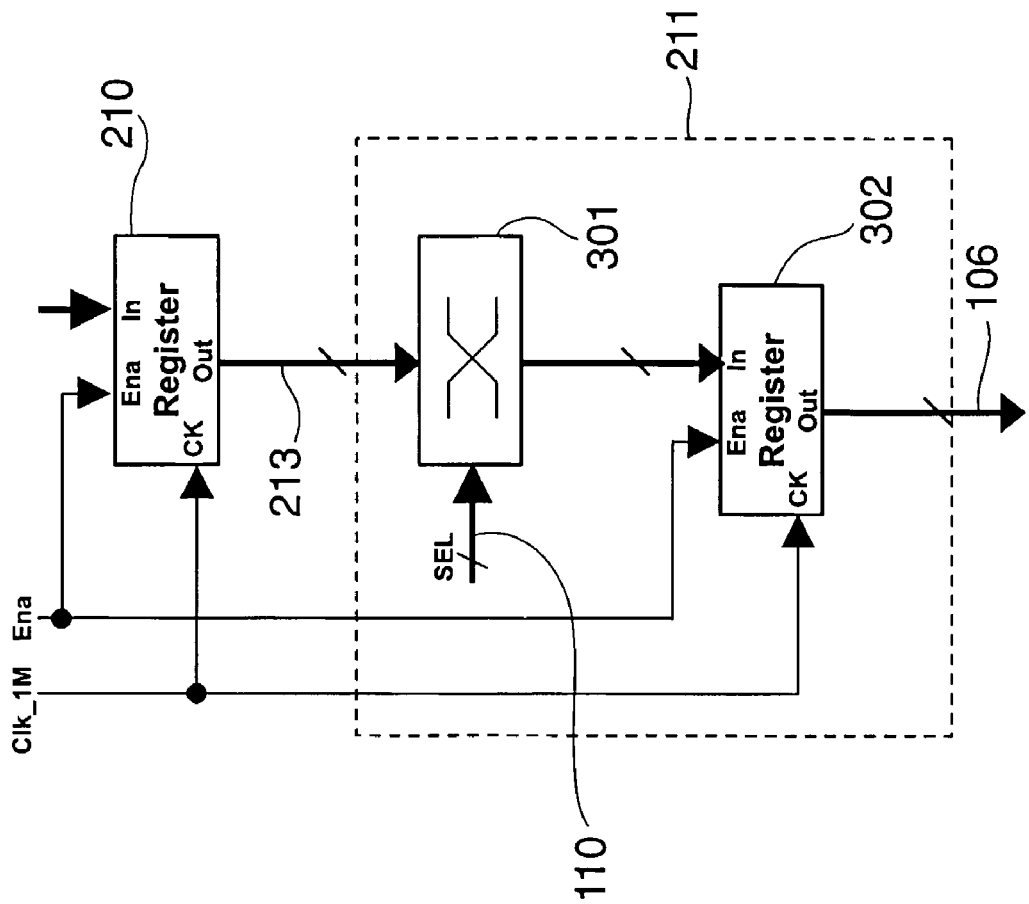
FIG. 3 is a block diagram showing in greater detail the scrambler circuit of FIG. 2.

As shown in FIG. 3, scrambler 211 essentially consists of a switching matrix 301, which receives the parallel words of MAX_COUNT bits on output 213 of register 210 and is controlled by a selection signal SEL present on line 110. Signal SEL represents a random number already available in mixing logic 103. SEL could for instance be obtained from some of the bits present on output 212 of recycle register 207. The output of switching matrix 301 is connected to an output register 302 similar to register 210 and also enabled by the output of counter 209 (FIG. 2).

Figure 4:
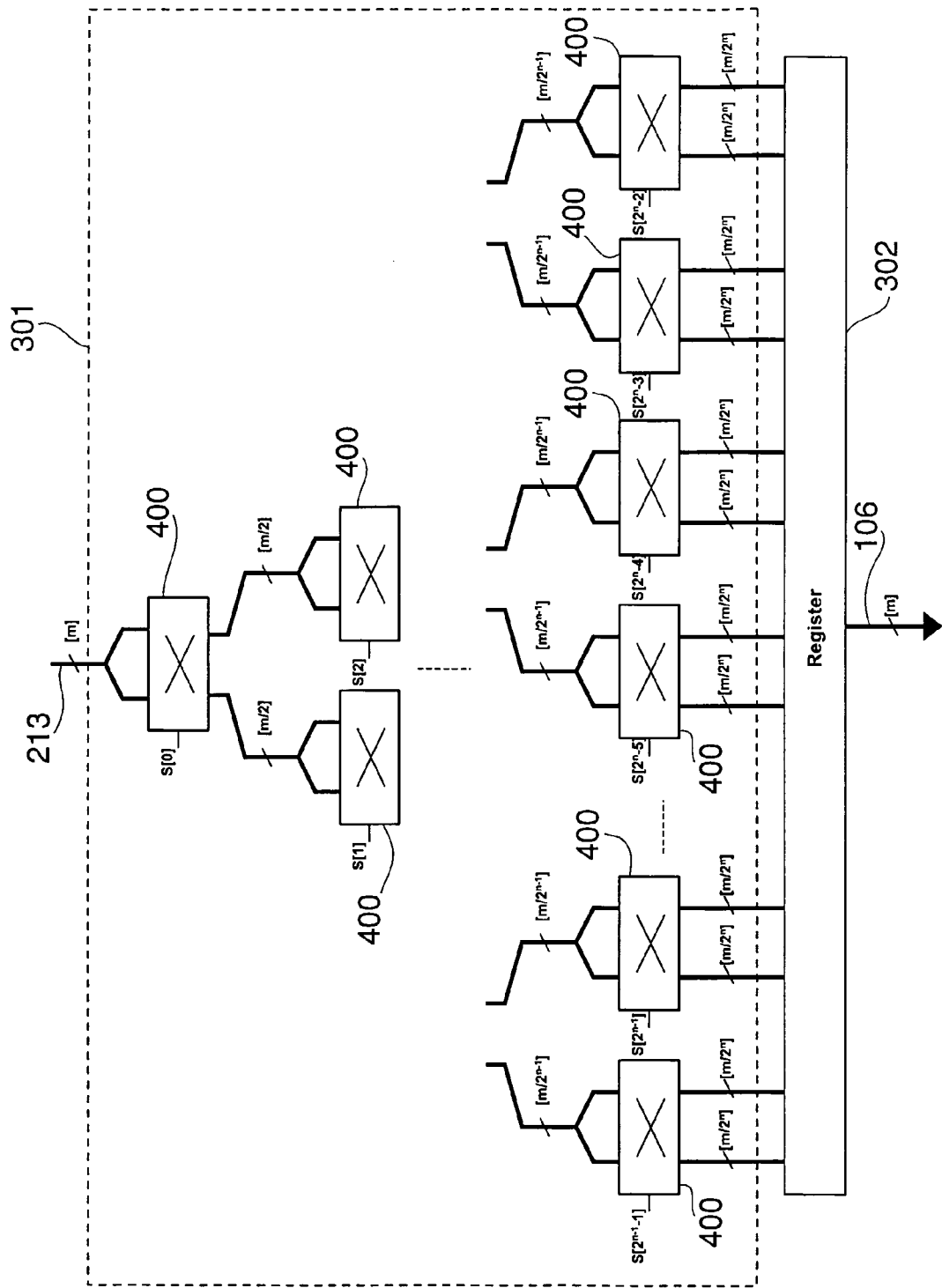
FIG. 4 is a diagram of the switching matrix of the scrambler circuit.

As shown in FIG. 4, switching matrix 301 might be an n-level binary tree of multiplexers or switches 400. With n levels of multiplexers a selector signal SEL of $2^n-1$ bits is needed. The select bits are denoted s(i) (i=0 ... $2^n-1$) in the drawing. Each switch 400 is arranged to let through the input bits unchanged or to mutually exchange the two half of the input bit group depending on the value of the select bit. Being the bits in select signal SEL random bits, each input word is scrambled in a random way thereby producing another word in which the simple observation of some bits does not allow predicting the future ones. By way of example, in case of 32-bit input words to switching matrix 301, n could be equal to 3.

From the foregoing description the skilled in the art will immediately appreciate that the whole generator can be readily implemented as an integrated circuit, e.g. an ASIC or an FPL/FPGA.

The skilled in the art can also appreciate that the disclosed circuit, besides being extremely secure, is also very flexible. Indeed, all operating parameters (clock rates, LFSR length, starting values for counters 205, 206) can be programmed and adapted to the specific application.

The high speed random number generator of the present invention operates according to a method of generation of random numbers in which the random numbers are generated by altering a pseudo-random sequence by means of true random numbers forming random seeds for the generation of the pseudo-random sequence.

Such method comprises the steps of:
obtaining the random seeds from a random sequence of bits having variable rate;
processing a random seed to generate an alteration signal TC1 exploiting the random arrival time of the bits of the sequence of bits; and
changing the pseudo-random sequence by means of the alteration signal TC1 at random instants between the arrival of two subsequent seeds, thereby obtaining in the interval multiple pseudo-random sequences of random lengths shorter than the lengths determined by the arrival of two subsequent seeds, the alteration signal TC1 being generated under the control of the pseudo-random sequence.

The alteration signal TC1 is generated at the end of a first countdown starting from a first random number represented by a randomly variable group of bits that are part of a rotated version of a received seed obtained by rotating the seed by an amount indicated by a second random number represented by a group of bits of the pseudo-random sequence. The first countdown starts whenever a seed is generated and restarts, between the arrival of two subsequent bits, whenever the countdown itself ends. The second random number is the starting value of a second countdown starting whenever the first down counting ends, the end of said second countdown stopping said seed rotation.

The pseudo-random sequence is generated by a linear feedback shift register 102, and the alteration signal TC1 is fed to a feedback logic 204b of the linear feedback shift register 102.

The altered pseudo-random sequence is then parallelised to create words of a desired length MAX_COUNT, and a random scrambling of said words is then performed.

The scrambling operation is controlled by a random selection signal obtained from the bits used to form the first random number.

In order to obtain an output bit rate independent from the rate of the random sequence of bits, the method further comprises a step of generating, starting from a first clock signal timing the seed generation, a second clock signal for timing the generation of the pseudo-random sequence and of the alteration signal (TC1), for the parallelisation of the output words and for the scrambling operation.

It is clear that the above description has been given by way of non-limiting example. For instance, even if the described embodiment uses a linear feedback shift register as PRNG 102, other implementations could be used for the pseudo-random generator, e.g. Congruential Generators or Add With Carry (AWC), Subtract With Borrow (SWB) and Multiply With Carry (MWC) generators. It is well in reach of the skilled in the art to implement an interaction between mixing logic 103 and pseudo-random generator 102 like the described one in any of these other generators. Note that, when using a pseudo-random generator different from an LFSR, output logic 104 could receive the output of PRNG 102 through mixing logic 103.

Although the invention has been mainly described referring to a hardware implementation, it is possible to implement it, in part or completely, by means of a computer or other suitable programmable hardware with code adapted to perform some or all of the steps of the method. In particular, the function of the true random number generator can be implemented by a portion of the same computer or hardware, or by a suitable additional hardware component.

The invention claimed is:

1. A random number generator, comprising:
a true random number generator generating a random sequence of bits having variable rate;
a pseudo-random number generator generating a pseudo-random sequence based on a random seed; and
a mixing logic connected between said true random number generator and said pseudo-random number generator, said mixing logic generating said random seed based on said random sequence of bits and altering the behavior of said pseudo-random number generator based on said random seed and said pseudo-random sequence,
said mixing logic comprising an alteration signal generator generating an alteration signal, said alteration signal altering the behavior of said pseudo-random number generator at multiple random instants in an interval between the arrival of two subsequent seeds, thereby obtaining, in said interval, multiple pseudo-random sequences of random lengths shorter than the random length determined by the arrival of two subsequent seeds, said alteration signal generator being connected so as to receive said seed and said pseudo-random sequence, and generating said alteration signal based on said seed and said pseudo-random sequence.

2. The random number generator as claimed in claim 1, wherein said alteration signal generator comprises:
a first down counter arranged to count down from a first random number represented by a first group of bits which are part of a randomly rotated version of a seed received by said alteration signal generator, said first counter loading said first random number and starting its countdown whenever a seed is available and, between the occurrence of two subsequent seeds, whenever it generates a terminal count signal, said terminal count signal being fed to said pseudo-random number generator as alteration signal;
a second down counter which is arranged to count down from a second random number represented by a group of bits of the sequence generated by said pseudo-random number generator and is arranged to load a new value of said second random number and to start again its countdown whenever said first down counter generates its terminal count signal; and
a recirculating shift register which receives the seeds and feeds said first down counter with said first random number, and which is arranged to generate said randomly rotated version of the seed in the intervals between the arrivals of two subsequent seeds by rotating the bits of the seed by an amount determined by the value of said second random number.

3. The random number generator as claimed in claim 1, wherein said pseudo-random generator is a linear feedback shift register and said alteration signal generator supplies said alteration signal to the feedback logic of said linear feedback shift register.

4. The random number generator as claimed in claim 1, wherein said mixing logic further comprises an input circuitry arranged to receive the random sequence of bits generated by said true random generator to build said seed by parallelising the bits of said random sequence and to generate a signal indicating the availability of a seed.

5. The random number generator as claimed in claim 2, wherein said recirculating shift register is arranged to load a seed directly whenever it receives said signal indicating the availability of the seed, and said pseudo-random number generator is arranged to load a new seed upon command of said first counter whenever the latter receives said signal indicating the availability of the seed.

6. The random number generator as claimed in claim 4, wherein said input circuitry comprises a clock signal generator for generating, starting from a first clock signal timing the operations of said input circuitry, and a second clock signal for timing said pseudo-random generator and said alteration signal generator whereby the output bit rate of the random number generator is independent of the rate of the random sequence of bits supplied by the true random generator.

7. The random number generator as claimed in claim 1, further comprising an output logic for parallelising the altered pseudo-random sequence and building words of a given length, said output logic comprising a scrambler for scrambling the bits in each word in random manner.

8. The random number generator as claimed in claim 7, wherein said scrambler is controlled by a random selection signal provided by said alteration signal generator.

9. The random number generator as claimed in claim 2, wherein a random selection signal is supplied by said recirculating shift register.

10. The random number generator as claimed in claim 7, wherein said scrambler circuit comprises a switching matrix comprised of an n-level binary tree of switches, each controlled by a respective bit of said random selection signal so as to scramble or to let through unchanged its input bits.

11. The random number generator as claimed in claim 7 implemented as an integrated circuit.

12. A method of generating random numbers, in which said random numbers are generated by altering a pseudo-random sequence based on said pseudo-random sequence and a random seed used for the generation of said pseudo-random sequence, the method comprising the steps of:
obtaining said random seed from a random sequence of bits having variable rate;
generating said pseudo-random sequence based on said random seed;
generating an alteration signal exploiting the random arrival time of the bits of said sequence of bits based on said random seed and said pseudo-random sequence; and
altering the pseudo-random sequence by said alteration signal at random instants between the arrival of two subsequent seeds, thereby obtaining, in said interval, multiple pseudo-random sequences of random lengths shorter than the lengths determined by the arrival of two subsequent seeds.

13. The method as claimed in claim 12, wherein said alteration signal is generated at the end of a first countdown starting from a first random number represented by a randomly variable group of bits that are part of a rotated version of a received seed obtained by rotating the seed by an amount indicated by a second random number represented by a group of bits of the pseudo-random sequence, the first countdown starting whenever a seed is generated and restarting, between the arrival of two subsequent bits, whenever the countdown itself ends; and wherein said second random number is the starting value of a second countdown starting whenever the first down counting ends, the end of said second countdown stopping said seed rotation.

14. The method as claimed in claim 12, wherein said pseudo-random sequence is generated by a linear feedback shift register and said alteration signal is fed to the feedback logic of said linear feedback shift register.

15. The method as claimed in claim 12, wherein the altered pseudo-random sequence is parallelised to create words of a desired length and further comprising a random scrambling of said words.

16. The method as claimed in claim 15, wherein said scrambling is controlled by a random selection signal obtained from the bits used to form said first random number.

17. A method as claimed in claim 12, further comprising the step of generating, starting from a first clock signal timing the seed generation and a second clock signal for timing the generation of said pseudo-random sequence and of said alteration signal, the parallelisation of the output words and the scrambling, whereby an output bit rate independent from the rate of the random sequence of bits is obtained.

18. A non-transitory computer readable storage medium encoded with a computer program product loadable into a memory of at least one computer and including software code portions capable of performing the method of claim 12.

* * * * *